Nov. 3, 1942.  P. I. NAGLE  2,300,688
FLUID IMPELLING DEVICE
Filed March 24, 1941

INVENTOR.
Perry I. Nagle
BY Wilkinson, Huxley, Byron & Knight
attys.

Patented Nov. 3, 1942

2,300,688

UNITED STATES PATENT OFFICE 2,300,688

FLUID IMPELLING DEVICE

Perry I. Nagle, Chicago Heights, Ill., assignor to The American Brake Shoe and Foundry Company, New York, N. Y., a corporation of Delaware Application March 24, 1941, Serial No. 384,809

11 Claims. (Cl. 103—103)

The present invention relates to fluid impelling devices and more in particular to fluid impelling devices of the vertical type, such as centrifugal pumps for pumping water or other fluids from pits, sumps or the like.

Among the objects of the present invention is to provide a novel centrifugal pump of the vertical type of simplified and compact construction wherein the various elements thereof are readily fabricated and assembled in operative association with one another with ease and facility.

One of the objects within the purview of the present invention is to provide a novel assembly for the fluid end of a fluid impelling device of the vertical type embodying in its construction a novel arrangement for the bearing which is provided for securing proper operative functioning of the impeller shaft, the said bearing according to the present invention being of multi-part construction facilitating its erection and assembly with respect to the impeller shaft, and in one of its embodiments being constituted by a split bearing yoke embracing the impeller shaft in bearing relation thereto and being secured in operative position by structural elements provided for the impeller housing.

Still another object of the present invention is to provide a novel assembly for the fluid end of a fluid impelling device of the vertical type incorporating bearing means for the impeller shaft and novel means for properly lubricating the said bearing during operation of the impeller shaft.

More particularly, the present invention contemplates novel structural features involving the use of struts for supporting the impeller housing, at least one of which provides a lubricant passage and reservoir in communication with which are one or more lubricant ducts or conduits for supplying lubricant therefrom to the bearing for the impeller shaft.

As a further feature of construction, the invention comprehends a novel impeller housing at the fluid end of a fluid impelling device of the vertical type, embodying in its structure novel means for taking up wear and to give adjustment thereto in respect of the impeller. More particularly, such housing assembly is of multi-part construction split horizontally with respect to the impeller whereby, by the proper incorporation of shims, gaskets or the like, or the provision of other adjustment features, the said housing can be assembled in proper operative association with the impeller either when originally installed or after wear has taken place.

As a still further object of the present invention, the novel features of construction hereinabove identified, either alone or in combination, can be embodied in a fluid impelling device of the vertical type wherein one or more of the struts for positioning the impeller housing and other elements of the device at its fluid end with respect to the supporting means or assembly therefor may embody a fluid passage communicating with the discharge end of the impeller housing and discharge means at the support for the assembly whereby fluid being pumped by the impeller is discharged through the said structural strut, thus providing a unique and compact arrangement for the entire assembly. As a still further object of the present invention, the above identified novel features of construction may be incorporated either alone or in combination with novel means whereby the said struts for the impeller housing may be readily adjusted with respect to the stand or supporting assembly to adjust the impeller housing in respect to the impeller.

Other objects, features, capabilities and advantages are comprehended by the invention, as will later appear and as are inherently possessed thereby.

Referring to the drawing.

Figure 1:
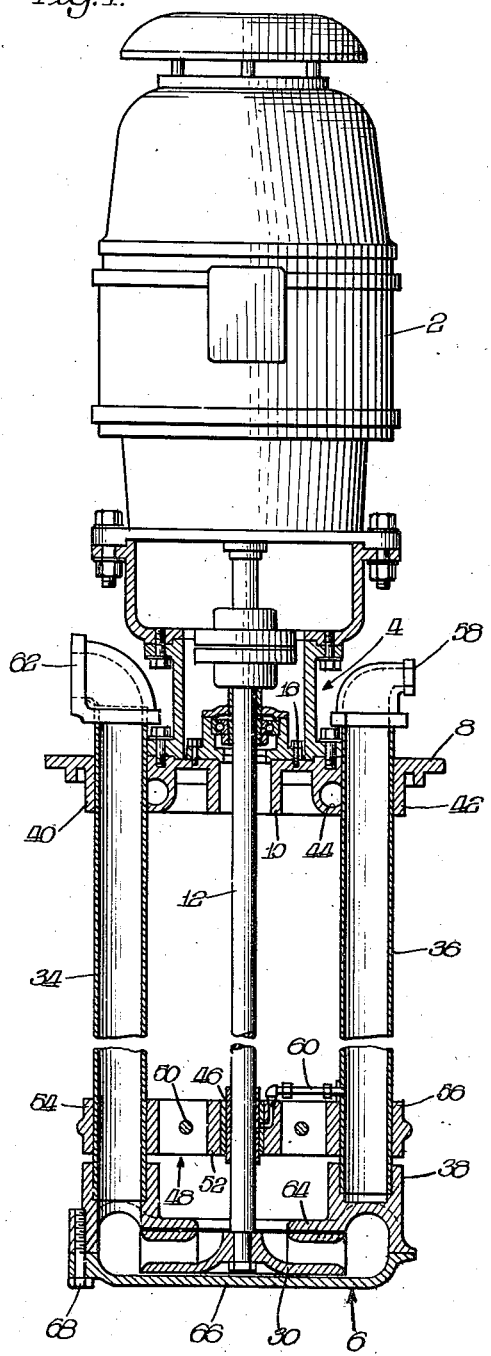
Figure 1 is a view partly in elevation and partly in section of a fluid impelling device of the vertical type embodying the novel features of the present invention.
Figure 2:
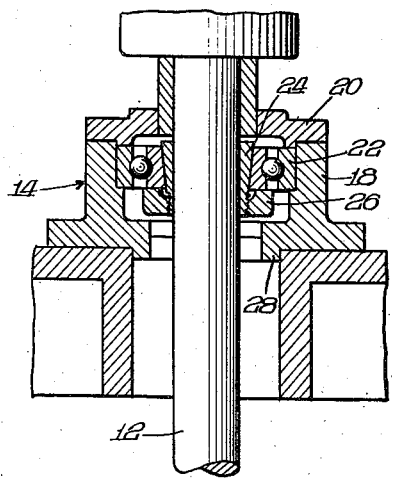
Figure 2 is a fragmentary view in section of a bearing used in connection with the assembly shown in Figure 1 of the drawing.

Referring now more in detail to the drawing, an embodiment selected to illustrate the present invention is constituted by a centrifugal pump of the vertical type embodying a motor 2 mounted upon a stand or supporting assembly 4 and having a water end 6 vertically aligned with respect to said motor 2 and supporting assembly 4 and adapted to be introduced into a sump, pit or the like, for pumping water or other fluid therefrom and discharging the same at some designated point. The said stand or supporting assembly 4 includes a floor plate 8 formed with a central flanged opening 10 for receiving the impeller shaft 12 which extends through and beyond the floor plate 8 and which is operatively mounted in a thrust bearing 14 which is secured by way of a plurality of bolts 16 to the floor plate 8. This thrust bearing is provided with the thrust collar 18 closed by the closure member 20 and which provides a seat for the anti-friction bearing 22. Said bearing has its inner race-ring in wedging relation to the split wedge 24 adjusted by way of the nut 26 which is in abutting relation with said inner race-ring whereby the adjusting wedge 24 can be tightened with respect to the impeller shaft 12 and the said anti-friction bearing to provide for the transfer of thrust from the shaft to the floor plate 8 through the bearing housing or collar 18, the said collar being positioned by the depending annular flange 28 fitting within the flanged opening 10 of said floor plate.

The fluid end of the centrifugal pump is constituted by an impeller 30 mounted at the end of the impeller shaft 12 and which is enclosed within the housing assembly 32 secured in operative association with the floor plate 8 by the hollow struts 34 and 36. The said struts are fixed in the hubs 38 of the housing and are slidably and adjustably received within the bearings 40 and 42 formed integral with the floor plate 8. The said struts are secured in any of their adjusted positions by means of the clamping bolts 44 mounted in the bearings 40 and 42 and conforming in all respects to the structure disclosed and claimed in application Serial No. 384,808, for Fluid impelling devices, filed March 24, 1941.

The impeller shaft 12 is operatively mounted adjacent the fluid end of the device by way of a bearing 46 mounted in a two-part or split bearing yoke 48, the parts of which are secured together by way of the bolts 50. This bearing yoke comprises a central bearing hub 52 embracing the bearing 46 and the end bearing hubs 54 and 56 adapted to embrace the struts 34 and 36, respectively, to properly position the bearing 46 with respect to the impeller shaft 12 when the bolts 50 are tightened. The yoke 48 is split in a vertical direction to facilitate the assembly of the structure involved under all conditions, and particularly in cramped quarters, as is usually experienced in pits, sumps or the like. This type of bearing yoke further facilitates the removal and replacement of the bearing 46 when that becomes necessary because of wear, deterioration, or for any other reason.

The present invention includes as another novel feature of construction the provision of the strut 36 as a hollow member having a fitting 58 at its upper end and above the floor stand 8 for the introduction of a lubricant, the said hollow strut 36 providing a lubricant passage and reservoir in communication with which are one or more ducts, such as 60, leading from the said strut and to the bearing 46, it being contemplated that sufficient lubricant will be retained within the strut 36 to provide a lubricating body for the bearing 46 to assure proper operation of the impeller shaft 12 at its lower end adjacent the impeller 30. Because of the particular arrangement of the bearing yoke and the lubricant feed, all in respect of the struts 34 and 36, as well as the housing 32, a rigid and compact arrangement is provided for all of the operating parts of the pump at its fluid end.

As an additional feature of construction, the strut 34 is likewise formed as a hollow member communicating at its lower end with the discharge for the housing 32 and having at its upper end a fitting 62 disposed above the floor plate 8 and to which may be connected any form of conduit for discharging fluid pumped by the impeller to any designated point.

A still further novel feature of construction is embodied in the housing assembly 32, the same being constituted by the provision of an impeller housing of two-part construction horizontally split to provide the upper part 64 and the lower part 66 secured together by way of a plurality of bolts 68. Shims or gaskets, while not shown in the drawing, may be provided between the parts to secure proper adjustment of the parts with respect to the impeller 30. Such novel form of construction also provides for the taking up of wear which may take place over the surfaces of the housing, and likewise provides a novel arrangement facilitating the removal of plate 66 from a sump or pit should this become necessary because of excessive wear or deterioration.

Figure 3:
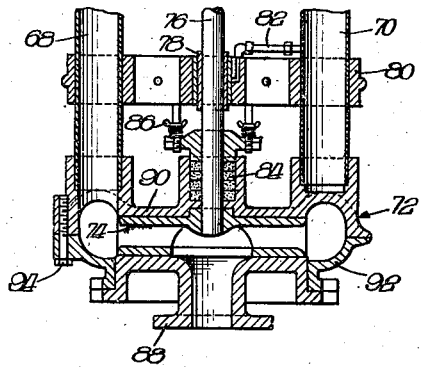
Figure 3 is a fragmentary view in section of the fluid end of another fluid impelling device of modified construction embodying therein novel features in accordance with the present invention.

The present novel features of construction above described may be embodied in a fluid impelling device of the vertical type of slightly different structure than that disclosed in Figure 1 of the drawing, and which, for convenience, is fragmentarily shown in Figure 3 of the drawing, the upper part of said construction conforming to that disclosed in Figure 1 if so desired. According to Figure 3 showing the fluid end of this modified form of centrifugal pump, the hollow struts 68 and 70 are fixed to the housing 72 in the manner as heretofore described in connection with the embodiment of Figure 1, the housing 72 providing an enclosure for the impeller 74 secured to the shaft 76 which is journaled in bearing 78 operatively mounted in the split bearing yoke 80 secured to the struts 68 and 70. Strut 70 provides a lubricant passage and reservoir in communication with which is a lubricant duct 82 for supplying lubricant to the bearing 78. Furthermore, the strut 68 is of hollow construction communicating at its lower end with the discharge for the housing 72 for discharging pumped fluid to the floor plate level and from its discharge end to any point designated.

The present modified form of construction is for use in dry pits or sumps, and accordingly embodies within its construction a packing gland 84 adjusted by way of the adjusting gland mechanism 86 to provide a fluid-tight joint between the impeller shaft 76 and the housing 72. The opposite side of the housing 72 is formed with a fitting 88 which may be secured to the flanged end of a conduit, pipe or the like, to provide a fluid-tight connection therewith whereby fluid may be sucked up into the impeller during its operation from said conduit and discharged through the hollow strut 68. As in the embodiment shown in Figure 1 of the drawing, the housing 72 is of multi-part construction, split horizontally to provide the parts 90 and 92, and to the lower part of which is secured the fitting 88. Part 92 is secured in adjusted relation to part 90 by way of a plurality of bolts 94, shims, gaskets or other adjusting means being used, if desired, to provide proper adjustment of the housing with respect to the impeller and to facilitate the taking up of wear due to the operation of the device.

The embodiment of Figure 3 of the drawing, as hereinabove alluded to, embraces a supporting or stand assembly conforming to that shown in Figure 1 of the drawing, and which may include means for adjusting the struts 68 and 70 with respect thereto for proper adjustment of the housing 72 with respect of the impeller 74.

While I have herein described and upon the drawing shown illustrative embodiments of the invention, it is to be understood that the invention is not limited thereto but may comprehend other constructions, arrangements of parts, details and features without departing from the spirit of the invention.

I claim:

1. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, at least one of said struts providing a lubricant passage, a bearing for said shaft spaced in relation to said stand assembly and secured to said struts, and a lubricant duct leading from said passage to said bearing.

2. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, at least one of said struts providing a lubricant passage, a bearing yoke split in the direction of the longitudinal axis of said shaft having bearing means embracing the same and being connected to said struts, and a lubricant duct leading from said passage to said bearing.

3. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, means for adjustably securing said struts with respect to one of said assemblies for adjustably positioning said impeller housing assembly with respect to said impeller, at least one of said struts providing a lubricant passage, a bearing for said shaft secured to said struts in spaced relation to said stand assembly, and a lubricant duct leading from said passage to said bearing.

4. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, means for adjustably securing said struts with respect to one of said assemblies for adjustably positioning said impeller housing assembly with respect to said impeller, at least one of said struts providing a lubricant passage, a bearing yoke split in the direction of the longitudinal axis of said shaft having bearing means embracing the same and being connected to said struts, and a lubricant duct leading from said passage to said bearing.

5. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, a bearing for said shaft spaced in relation to said stand assembly and connected to said struts, one of said struts providing a lubricant passage and reservoir, a lubricant duct leading from said strut to said bearing to supply lubricant thereto, and another of said struts providing a fluid passage from said housing assembly and having discharge means adjacent said stand assembly.

6. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, means for adjustably securing said struts with respect to one of said assemblies for adjustably positioning said impeller housing assembly with respect to said impeller, a split yoke having bearing means embracing said shaft and connected to said struts in spaced relation to said stand assembly, one of said struts providing a lubricant passage and reservoir, a lubricant duct leading from said strut to said bearing means to supply lubricant thereto, and another of said struts providing a fluid passage from said housing assembly and having discharge means adjacent said stand assembly.

7. In a fluid impelling device of the vertical type, the combination of a floor plate for support of said device, said floor plate having bearing sockets formed with substantial bearing surfaces, an impeller shaft operatively mounted with respect to said floor plate and extending therethrough and having an impeller mounted thereon in spaced relation to said floor plate, a housing assembly for said impeller, positioning elements connected to said housing adjustably and telescopically received in said bearing sockets and having substantial bearing relation with the bearing surfaces thereof for mounting said impeller housing with respect to said floor plate independently of said impeller, and means mounted in said floor plate engageable with said positioning elements for adjustably securing the same with respect to said floor plate with said substantial bearing relation between said elements and socket bearings whereby said housing assembly is rigidly and adjustably aligned with respect to said impeller.

8. In a fluid impelling device of the vertical type, the combination of a floor plate for support of said device, said floor plate having bearing sockets formed with substantial bearing surfaces, an impeller shaft operatively mounted with respect to said floor plate and extending therethrough and having an impeller mounted thereon in spaced relation to said floor plate, a housing assembly for said impeller, positioning elements connected to said housing adjustably and telescopically received in said bearing sockets and having substantial bearing relation with the bearing surfaces thereof for mounting said impeller housing with respect to said floor plate independently of said impeller, at least one of said positioning elements being of hollow construction providing a fluid passageway, and clamping bolts mounted in said floor plate engageable with said positioning elements for adjustably securing the same with respect to said floor plate with said substantial bearing relation between said elements and socket bearings whereby said housing assembly is rigidly and adjustably aligned with respect to said impeller.

9. In a fluid impelling device of the vertical type, the combination of a floor plate for support of said device, an impeller shaft operatively mounted with respect to said floor plate and extending therethrough and having an impeller mounted thereon in spaced relation to said floor plate, a housing assembly for said impeller, positioning elements connected to said housing adjustably received in bearings formed in said floor plate, one of said positioning elements being of hollow construction providing a discharge for said housing assembly, and clamping bolts mounted in said floor plate engageable with said positioning elements for adjustably securing the same with respect to said floor plate whereby said housing assembly is adjustably positioned with respect to said impeller.

10. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, at least one of said struts providing a lubricant reservoir, a bearing for said shaft, and a lubricant duct leading from said reservoir to said bearing.

11. In a fluid impelling device, the combination of a stand assembly, an impeller shaft operatively mounted with respect to said assembly and having an impeller mounted thereon in spaced relation to said assembly, a housing assembly for said impeller, a plurality of struts connecting said housing and stand assemblies, at least one of said struts providing a lubricant reservoir, a bearing for said shaft, a lubricant duct leading from said reservoir to said bearing, and at least another of said struts providing a fluid passage from said housing assembly and having discharge means adjacent said stand assembly.

PERRY I. NAGLE.